June 10, 1969 D. V. WATKINS 3,448,951
VIBRATION ISOLATION SYSTEM
Filed Oct. 13, 1967 Sheet 1 of 3
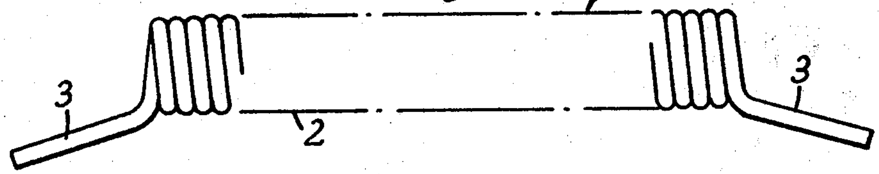
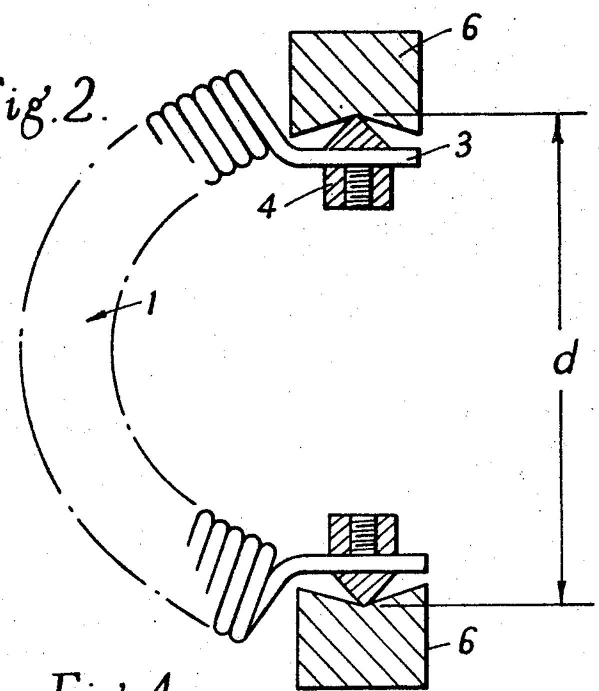
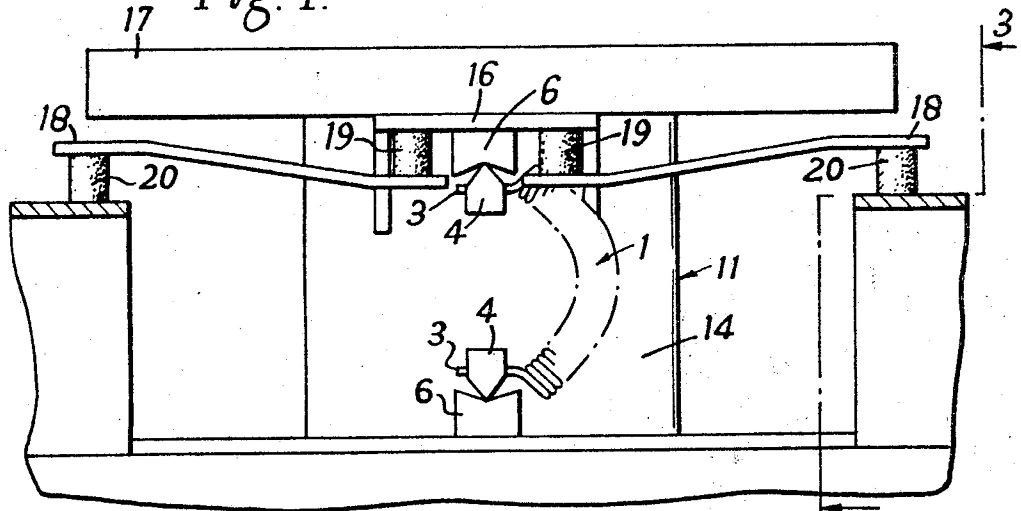
DAVID VAUGHAN WATKINS.
INVENTOR
By Wenderoth, Lind & Ponack, Attorneys

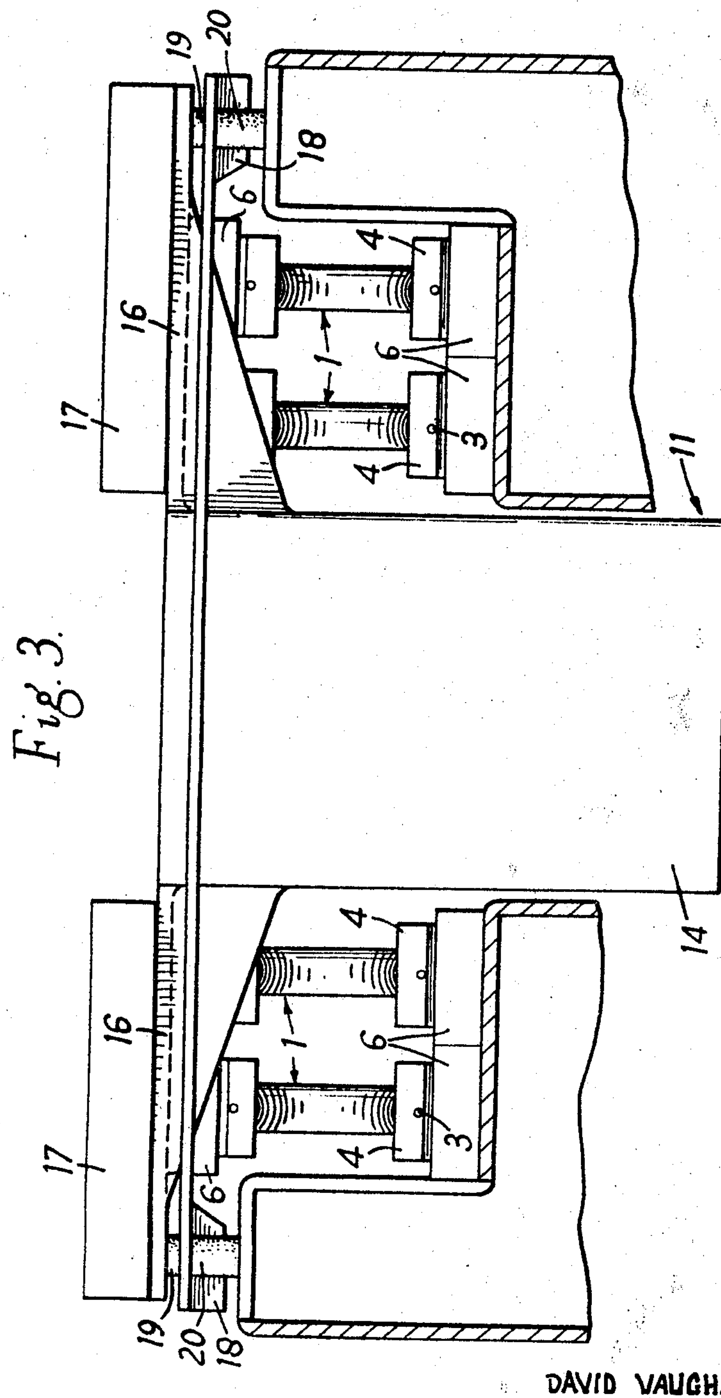
DAVID VAUGHAN WATKINS.
INVENTOR
By Wenderoth, Lind & Ponack
attorneys

DAVID VAUGHAN WATKINS.
INVENTOR
By Wenderoth, Lind & Ponack
Attorneys 3,448,951
Patented June 10, 1969

3,448,951

VIBRATION ISOLATION SYSTEM

David Vaughan Watkins, 66 Bedford Gardens, London, W. 8, England

Filed Oct. 13, 1967, Ser. No. 675,152
Claims priority, application Great Britain, Oct. 18, 1966, 46,621/66
Int. Cl. F16f *15/06;* E02d *27/44;* F16m *7/00*
U.S. Cl. 248—18 4 Claims

ABSTRACT OF THE DISCLOSURE

A vibration isolation system for isolating a suspended mass utilises a plurality of bowed coil springs, carrying a knife edge member at each end and supporting said mass. The size and number of the coil springs is selected in accordance with the suspended mass and the springs may be adjusted to the mass by adjustment of the position of the knife edges on the terminal portion of the spring. Movement of the suspended mass in the horizontal plane is restrained by radius rods or the like.

The present invention relates to a vibration isolation system, which has been developed to meet the problems which arise with high speed check weighing machines. Whilst the vibration isolation system of the present invention will be described primarily by reference to the problems of check weighing machines it is to be understood that the system is equally applicable to the isolalation of other apparatus where similar considerations arise.

In the case of a check weighing machine, which is adapted to pass or reject a package or the like depending upon its divergence in weight from a standard weight the purpose of isolating the machine from vibration is that, although vibration has no theoretical affect when the weighing scale of the check weighing machine is perfectly balanced, the effect of vibration can be to distort the effects of the inevitable out-of-balance forces, which occur in practice because successive packages vary in weight to a greater or lesser extent from the counterweight against which they are compared. Errors will arise in operation unless the check weighing apparatus is effectively isolated from the inevitable vibrations in factory floors, on which it is likely to be standing.

The degree of attenuation of vibration depends on the difference between the natural frequency of vibration of the isolation system from the frequency of the applied vibration and the mass of the apparatus to be isolated.

Commercially available vibration isolation mounts usually have a natural frequency of at least 8 cycles per second, so as to isolate the supported load effectively against vibrations of a frequency higher than 25 to 30 cycles per second, which occur in the floor to which the vibration isolation mounts are secured. However, in the case of check weighing apparatus it is found that the normally available vibration isolation mounts are unsatisfactory in that they do not effectively isolate the apparatus from factory floor vibrations of relatively low frequency. It is found that vibrations having a frequency as low as 5 cycles per second can be present in factory floors at amplitudes which seriously affect the accuracy of the operation of check weighing apparatus.

A high speed check weighing apparatus, in which the weighing scale must necessarily settle within a period of a few milliseconds, is found to be sensitive to floor vibrations of a frequency down to about 5 cycles per second and amplitudes which may be expected to occur in factory floors. Below this frequency the amplitude of a vibration, which will upset the accuracy of the check weighing apparatus, increases rapidly with further decrease of vibration frequency. If a vibration isolation system can be devised having a natural frequency not greater than about 1 cycle per second, then it can effectively isolate a check weighing apparatus against harmful floor vibrations normally encountered in factory floors.

It has long been known that a close wound coil spring with a degree of initial tension, requiring an axial force before the coils begin to separate, has unusual characteristics when bent round into a C-shape. It is known that with springs of this type the two ends of the spring may be moved towards and away from each other over a certain range of distance with substantially no change in the loading acting on the spring. It is already known to use springs in this so-called "crippled" or bowed condition in electric motors to act on the brushes which can thus be pressed against a commutator without substantial change in loading at various stages in the life of the brushes.

In accordance with the broadest aspect of the invention a vibration isolation mount comprises a fixed base to be secured to a floor and a machine base supported by such so-called "crippled" or bowed coil springs arranged between the fixed base and the machine base. It will be appreciated that if the load imposed on the machine base is such that very slight changes in its value would lead to very large movements of the ends of the bowed springs towards and away from each other, then the natural frequency of the vibration isolation system could be very low so that the system could isolate a machine supported on the machine base from the effect of even quite low frequency vibrations of the order of 5 cycles per second.

Whereas it might be thought that the arrangement of a number of bowed coil springs between the fixed base and the machine base could lead to a satisfactory vibration isolation system, it is found that this cannot be achieved if the ends of the bowed springs are connected to the bases by ordinary pegs, passing through eyes at the end of the springs. The friction between the pegs and the spring eyes is responsible for the not wholly satisfactory operation of such a system.

In accordance with the preferred feature of the present invention a vibration isolation system comprises a fixed base and a machine mounting base and has a rated load capacity, the machine mounting base being supported by a plurality of bowed coil springs, each of such springs being arranged to be in contact with the machine base and the fixed base through knife-edge means acting on both ends of the springs, the machine base being restrained from movement in transverse directions. Preferably each spring carries a pair of knife-edge members secured to uncoiled terminal portions at each end of the spring. Each knife-edge member is then made so as to be longitudinally adjustable on such terminal portions of the spring and is arranged to locate in a shallow V-shaped member secured to the adjacent base.

Thus in the ordinary way each spring carries a longitudinally adjustable knife-edge member at each end and such knife-edge members locate in cooperating members carried by the two bases. It is, however, possible to arrange that the knife-edge members are permanently secured to the two bases and locate in shallow V-shaped seating members carried by the ends of the spring. In this latter case the shallow V-shaped members are preferably longitudinally adjustable on the straight ends of the spring to enable the system to be matched with the load which it is desired to impose on the machine base.

Since the crippled springs are unstable with respect to all loads, except those tending to move their two ends towards each other, it is necessary to restrain the machine base against movement in the horizontal plane, without at the same time imposing any appreciable restraint on its movement in the vertical plane. This is most easily achieved by the use of Panhard rods or similar devices for connecting the machine base to a stationary part of the structure.

With this arrangement the vibrational frequency of the system may be as low as half a cycle per second and thus, if the mass of the equipment supported on the machine base is high, it will be substantially isolated against the effects of vibration, unless the amplitude of floor vibrations having a frequency of 5 cycles per second or less is extremely high.

Referring now to the accompanying drawings:

FIGURE 1 shows a coil spring in free, unstressed condition,

FIGURE 2 shows a coil spring in the bowed condition and provided with knife-edge members in accordance with the present invention, FIGURE 3 is a side view of a vibration isolation system in accordance with the present invention, FIGURE 4 is an end view of the system of FIGURE 3.

Figure 5:
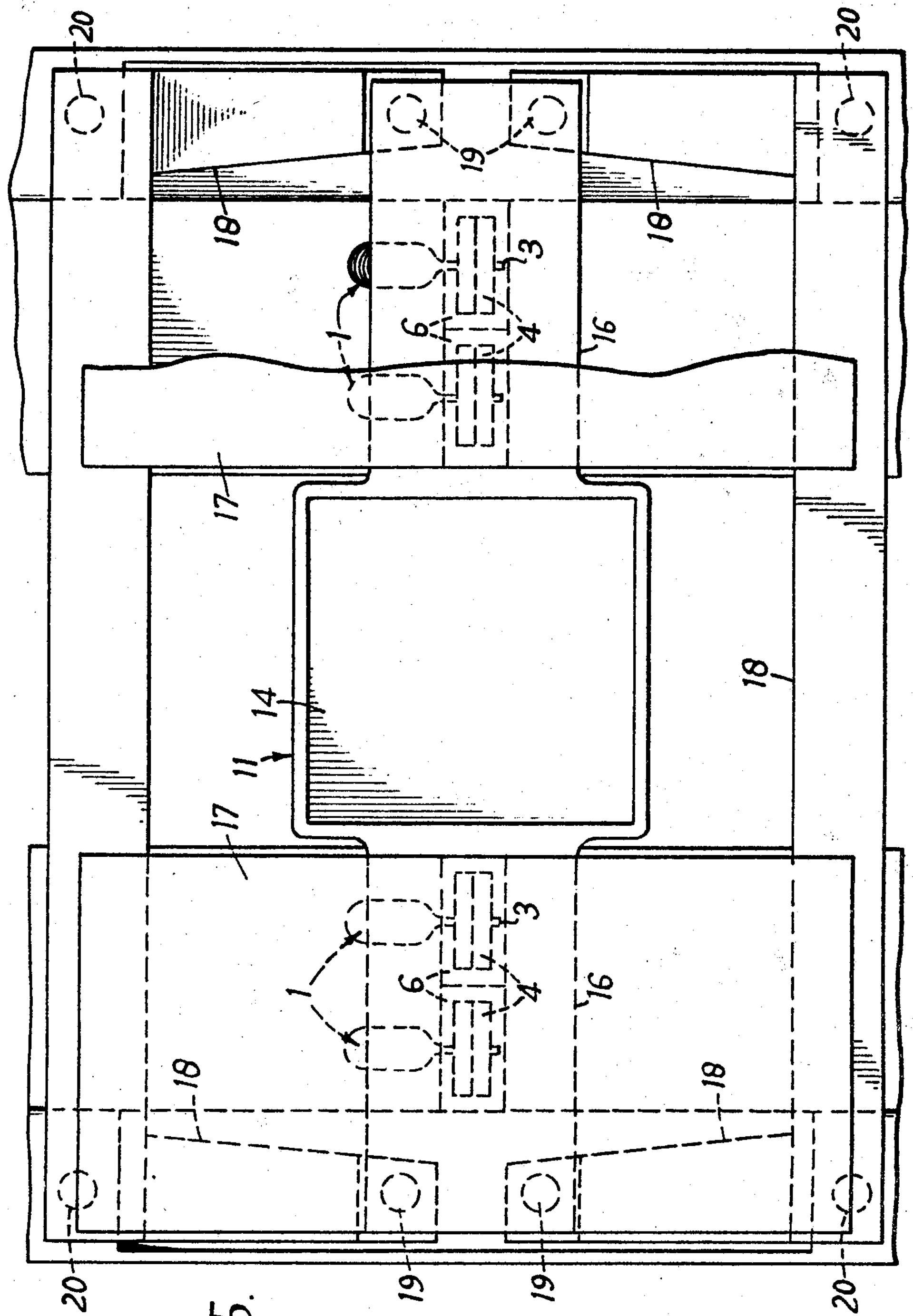
FIGURE 5 is a plan view of the system of FIGURES 3 and 4.

A typical spring 1 for use in the vibration isolation system of the present invention is illustrated in FIGURE 1 and comprises a helically wound portion 2 and ends 3. The spring is of the known type in which the helically wound portion 2 does not commence to extend until a predetermined tension is applied to it.

The basic spring unit of the isolation system is illustrated in FIGURE 2. The spring 1 carries knife-edge members 4, which are clamped to the ends 3 by means of set screws 5. The knife-edge members 4 seat in seating members 6. It is a known characteristic of the type of spring illustrated in FIGURE 1 that when held in the bowed condition illustrated in FIGURE 2, the force exerted by the spring 1 through the knife-edge members 4 on the seating members 6 is substantially constant through a wide range of values of the distance $d$ between the knife-high edges of the members 4. If one of the members 6 is fixed, a very small change in the loading on the other member 6 will lead to a substantial change in the value of the distance $d$. At equilibrium the loading on the members 6 will depend upon the characteristics of the spring, but it will be appreciated that the equilibrium loading on the spring for a given value of the distance $d$ can be varied within relatively narrow limits by adjusting the position of the knife-edge members 4 on the ends 2 of the spring.

It will be understood that the size and number of bowed springs in a vibration isolation system may be approximately based on the weight of the apparatus to be isolated from vibration and that the system may then be turned to the supported weight by variation of the knife-edge members 4 on the springs.

The spring unit shown in FIGURE 2 is quite unstable with regard to relative horizontal movement of the two ends of the spring and therefore in a vibration isolation system, means must be provided for restraining movement of the members 6 except in the plane of the knife edges.

Referring now to FIGURES 3, 4 and 5, the vibration isolation system illustrated in it comprise a base 10, which may be of any type of frame in which vibrations may arise. The base 10 has four support members 6 secured to it in line with each other. A support frame 11, which forms a machine base for a machine or apparatus intended to be isolated from vibration likewise carries a line of four support members 6 and rides on the knife edges of a row of four knife-edge members 4 carried by springs 1. The springs 1 also carry knife-edge members 4 resting on the row of fixed support members 6.

For purposes of illustration the support frame 11 is indicated as including a central box-shaped portion 14 and laterally extending arms 16, to which the support members 6 are secured. The frame 11 is illustrated as carrying weights 17 to indicate that the mass supported by the springs 1 must be quite large so as to respond slowly to the vibrational energy acting on the base 10.

To stabilise the system against movement in the horizontal plane, a pair of radius or limiting link members 18 are provided, preferably at each end, the shape of which can be seen from FIGURES 4 and 5. The radius members 18 are secured to the support frame 11 by rubber blocks 19 and to the base by rubber blocks 20, the rubber blocks 19 and 20 thus effectively acting as torsional pivots.

While in the arrangement shown in FIGURES 3, 4 and 5 the knife-edge members 4 are all arranged in line, other arrangements may be employed without departing from the scope of the invention and indeed the knife edges may be placed in any desired arrangement provided that the load on each spring is appropriate to its rating. In every arrangement it is necessary to restrain the machine base from movement in the horizontal plane in relation to the fixed base.

I claim:

1. A vibration isolation system comprising a fixed base and a machine mounting base, the machine mounting base being supported by a plurality of bowed coil springs disposed between said machine mounting base and said fixed base, means supporting the respective ends of each spring for pivotal movement with respect to the adjacent base, said means including interengageable pivotally coacting knife-edge and seating members carried by each of said springs and its adjacent bases, and means for restraining the machine base against movement in transverse directions.

2. A vibration isolation system according to claim 1 wherein the knife-edge members are carried at each end of each bowed spring, said knife-edge members seating in seating members carried by said fixed base and said machine mounting base respectively.

3. A vibration isolation system according to claim 2, wherein the knife-edge members further include adjustment screw means whereby said knife-edge members are adjustably secured to terminal portions of said bowed springs.

4. A vibration isolation system according to claim 1 in which the fixed base is connected to the machine base by a pair of opposed flexibly mounted link members having free ends, said link members being connected to the machine base by bonded rubber-like blocks at or near the free ends of the arms of said members and to the fixed base by bonded rubber-like blocks at or near the opposite end of the arms of said members to prevent the transverse movement of said machine base in relation to said fixed base.

References Cited

UNITED STATES PATENTS

| | | | |
|---|---|---|---|
| 1,438,790 | 12/1922 | Schwanhausser | 248—18 |
| 1,794,402 | 3/1931 | Hahn | 248—18 |
| 2,064,751 | 12/1936 | Hussman | 248—21 |

ROY D. FRAZIER, *Primary Examiner.*

J. F. FOSS, *Assistant Examiner.*

U.S. Cl. X.R.

248—358; 267—1